(12) United States Patent
Witzel et al.

(10) Patent No.: US 9,191,518 B2
(45) Date of Patent: Nov. 17, 2015

(54) ROUTING SYSTEM FOR TRANSFERRING DATA PACKETS OF A CALL

(75) Inventors: Andreas Witzel, Herzogenrath (DE); Dirk Kampmann, Vaals (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 25 days.

(21) Appl. No.: 14/353,083

(22) PCT Filed: Oct. 21, 2011

(86) PCT No.: PCT/EP2011/068480
§ 371 (c)(1),
(2), (4) Date: Apr. 21, 2014

(87) PCT Pub. No.: WO2013/056750
PCT Pub. Date: Apr. 25, 2013

(65) Prior Publication Data
US 2014/0269599 A1 Sep. 18, 2014

(51) Int. Cl.
*H04L 12/66* (2006.01)
*H04M 7/00* (2006.01)
*H04L 12/717* (2013.01)
*H04W 40/02* (2009.01)
*H04W 40/00* (2009.01)

(52) U.S. Cl.
CPC ............. *H04M 7/0075* (2013.01); *H04L 45/42* (2013.01); *H04W 40/02* (2013.01); *H04W 40/00* (2013.01)

(58) Field of Classification Search
CPC ..... H04L 12/56; H04L 2012/56; H04L 45/02; H04L 45/04; H04L 45/10; H04L 12/66; H04L 2012/46; H04L 2012/5618; H04L 12/46; H04L 12/4625; H04L 12/462; H04L 12/40097; H04L 12/4009
USPC .......... 370/389, 231, 401, 402, 351, 352–357
See application file for complete search history.

(56) References Cited

U.S. PATENT DOCUMENTS 7,082,116 B2 * 7/2006 Reza et al. ..................... 370/338
2008/0279183 A1 * 11/2008 Wiley et al. .................. 370/389

(Continued)

OTHER PUBLICATIONS

International Search Report, PCT Application No. PCT/EP2011/068480, Mar. 26, 2012.

(Continued)

*Primary Examiner* — Brenda H Pham
(74) *Attorney, Agent, or Firm* — Myers Bigel Sibley & Sajovec, P.A.

(57) ABSTRACT

A routing system transfers data packets of real time communication services of a call, and includes a converter receiving media gateway control protocol encoded first control data and processing the first control data to obtain second control data. The system, based on the first control data, allocates a first transport address for a first routing port for incoming data packets, and allocates a second transport address for a second routing port for outgoing data packets. A central control entity controls a central control entity controlled network of forwarding elements, and determines a static pathway through the network of forwarding elements based on the second control data. A first end of the static pathway corresponds to the first routing port and a second end corresponds to the second routing port. The central control entity controls a data plane flow of a stream of the data packets along the static pathway.

20 Claims, 12 Drawing Sheets

(56) References Cited

U.S. PATENT DOCUMENTS

2009/0003358 A1* 1/2009 Son et al. .................. 370/401
2011/0080836 A1* 4/2011 Bragg et al. ............... 370/241.1

OTHER PUBLICATIONS

Written Opinion of the International Searching Authority, PCT Application No. PCT/EP2011/068480, Mar. 26, 2012.
Written Opinion of the International Preliminary Examining Authority, PCT Application No. PCT/EP2011/068480, Dec. 4, 2013.
International Preliminary Report on Patentability, PCT Application No, PCT/EP2011/068480, Feb. 28, 2014.
Björkman et al., "Open Control of Partitioned Switches", *Proceedings of the IEEE Conference on High Performance Switching and Routing*, 2000, Jun. 26, 2000, pp. 549-556.
OpenFlow Switch Specification, Version 1.1.0 Implemented (Wire Protocol 0x02), Feb. 28, 2011, 56 pp.
Yang et al., "Forwarding and Control Element Separation (ForCES) Framework, draft-ietf-forces-framework-08.txt", Aug. 1, 2003, 39 pp.

* cited by examiner

ROUTING SYSTEM FOR TRANSFERRING DATA PACKETS OF A CALL

CROSS REFERENCE TO RELATED APPLICATION

This application is a 35 U.S.C. §371 national stage application of PCT International Application No. PCT/EP2011/068480, filed on 21 Oct. 2011, the disclosure and content of which is incorporated by reference herein in its entirety. The above-referenced PCT International Application was published in the English language as International Publication No. WO 2013/056750 A1 on 25 Apr. 2013.

TECHNICAL FIELD

The present invention relates to a routing system for a mobile communications network for transferring data packets of real time communication services, a method for transferring the data packets, and a converter for use in the mobile communications network.

BACKGROUND

The Third Generation Partnership Project (3GPP) standard Release 4 architecture utilizes a mobile switching centre server (MSC-S) as controlling element and a media gateway node (MGW) to do the data plane handling of packet-based voice calls in the circuit switched (CS) domain of a core network (CN).

The MSC-S contains the mobility management and the call control logic without residing in the media pathway of real time communication services such as voice streams or video streams. The media pathway passes through one or more MGWs. The MGW is an element maintaining a call connection and performing switching function when required. The MGWs establish, manipulate, and release the media streams. The way the MSC-S controls the MGW is defined by the media gateway control protocol framework, also referred to as the H.248 protocol framework (MEGACO). Further control signaling occurs between a radio network controller (RNC) and the MSC-S.

Generally mobile data traffic volumes are steadily increasing. Reasons for this can be, e.g., users watching online videos. In some regions, the data traffic volumes are exceeding the volumes for CS voice data traffic already today, while all others regions show a similar trend. With the availability of the 4G radio technology (LTE) this trend can be expected to increase.

In this light, a MSC-S and MGW are supporting IP transport already today. For example, the MSC-S and the MGW of today already support packet based functionality via internet protocol (IP) for data transport between nodes in the core network. Also the CS RNCs and base station controllers (BSCs) support IP based data transport. This is known as "A-interface over IP" (AoIP) and "Iu over IP". In networks which are predominantly based on packet traffic in the packet switched (PS) domain, maintaining the CS domain for voice traffic in the CN may become complex and costly.

Accordingly, a need exists to provide efficient routing techniques for data packets of real time communication services of a call.

SUMMARY

In an embodiment, a routing system for a mobile communications network for transferring data packets of real time communication services of a call is provided. The routing system comprises a converter which is configured to receive media gateway control protocol encoded first control data and to process the first control data to obtain second control data. The converter is further configured to, based on the first control data, allocate a first transport address for a first routing port for incoming data packets, and allocate a second transport address for a second routing port for outgoing data packets. The routing system also comprises a central control entity which is controlling a central control entity controlled network of forwarding elements. The central control entity is configured to determine a static pathway through the network of forwarding elements based on the second control data. Herein a first end of the static pathway corresponds to the first routing port and a second end of the static pathway corresponds to the second routing port. Furthermore, the central control entity is configured to control a data plane flow of a stream of the data packets along the static pathway.

In another embodiment, a method for transferring, in a mobile communications network, data packets of real time communication services of a call is provided. The method comprises receiving media gateway control protocol encoded first control data and processing the first control data to obtain second control data. Furthermore, the method comprises, based on the first control data, allocating a first transport address for a first routing port for incoming data packets and allocating, based on the first control data, a second transport address for a second routing port for outgoing data packets. Furthermore, the method comprises determining, based on the second control data, a static pathway through a central control entity controlled network of forwarding elements, wherein a first end of the static pathway corresponds to the first routing port, and a second end of the static pathway corresponds to the second routing port. Furthermore, the method comprises controlling a data plane flow of a stream of the data packets along the static pathway.

In a further embodiment, a converter for use in a mobile communications network for processing first control data relating to a call is provided. The converter comprises a processor and an interface, wherein the interface is adapted to receive media gateway control protocol encoded first control data. The processor is adapted to process the first control data to obtain second control data and the interface is adapted to provide the second control data to a central control entity. Furthermore, the processor is adapted to allocate, based on the first control data, a first transport address for a first routing port for incoming data packets of real time communication services of the call, and a second transport address for a second routing port for outgoing data packets of real time communication services of the call. The first routing port corresponds to a first end of a static pathway for a data plane flow of a stream of the data packets through a network of forwarding elements controlled by a central control entity and the second routing port corresponds to a second end of the static pathway.

Further embodiments, other methods or devices may be provided, e.g., as explained in the following detailed description.

DETAILED DESCRIPTION

In the following, the invention will be explained in more detail by referring to exemplary embodiments and to the accompanying drawings. The illustrated embodiments relate to techniques for transferring data packets of a call in a mobile communications network, e.g., according to the 3GPP Release 4 specifications. However, it is to be understood that the concepts as described herein may also be applied to other types of mobile communication networks, e.g., 3GPP standard of different releases.

Figure 1:
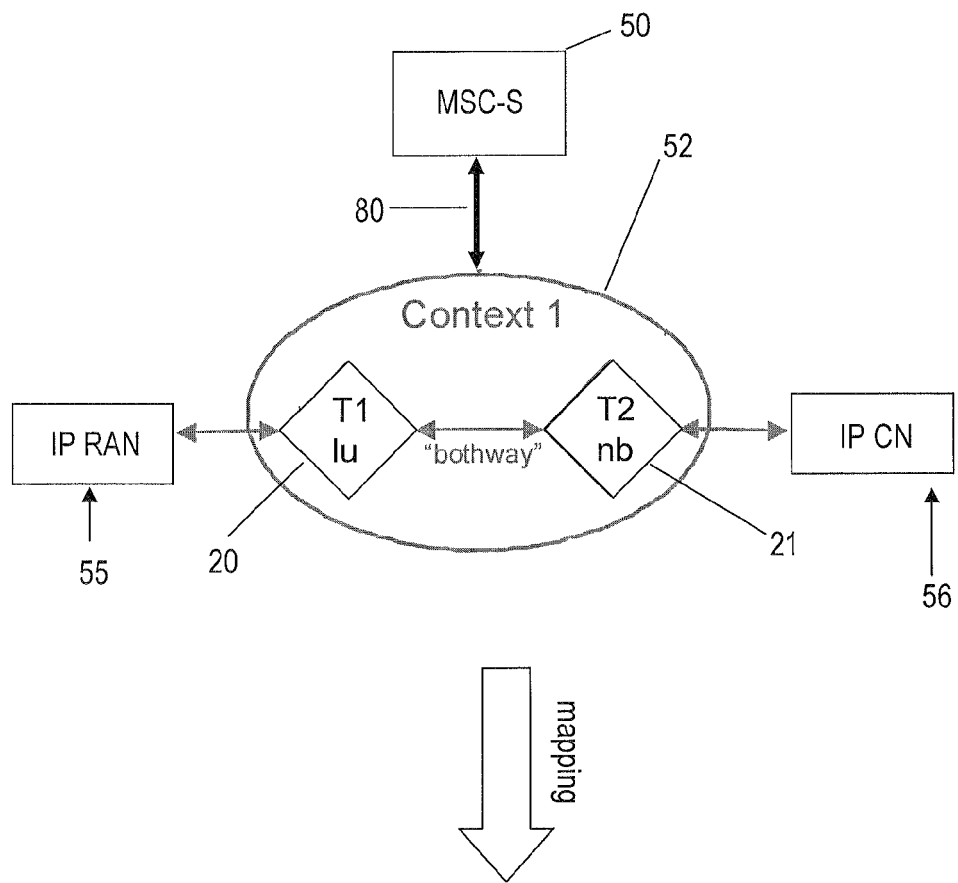
FIG. 1 is a schematic illustration of central control entity controlled network of forwarding elements transferring data packets between a radio network controller and a core network.
Figure 1:
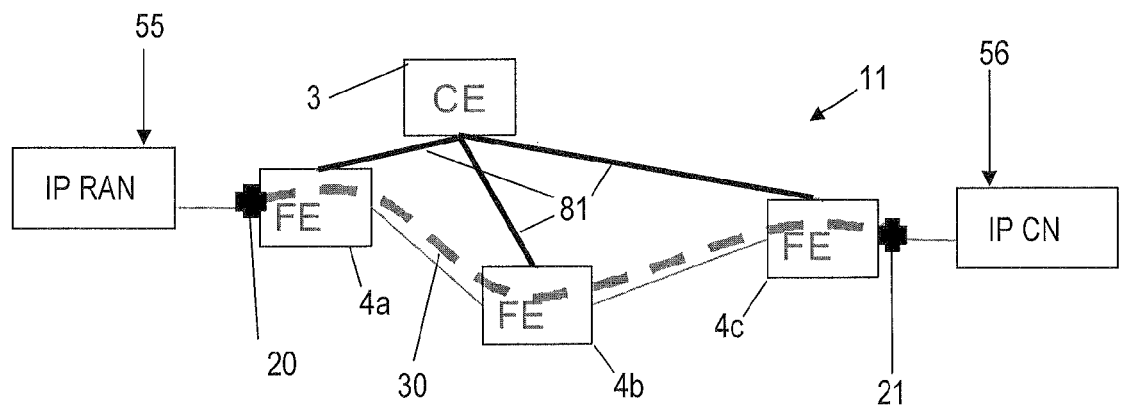

FIG. 1 illustrates parts of a mobile communication network in which concepts according to embodiments of the invention may be applied. The upper part of FIG. 1 shows the H.248 connection model of a call, consisting of a context "Context 1" and two terminations labeled T1 and T2. In 3GPP Release 4, this connection model is used for establishment of a call in the circuit switched (CS) domain of a core network (CN), for example between a radio access network 55 and a core network 56. Such a call can be a voice call or more generally a real time communication service, e.g., a speech call, or a video call, or a data call, or the like. The quality of a real time communication call can be very susceptible to delay. Here a real time communication service can relate to a mode of telecommunication in which the users exchange peer-to-peer information instantly or with negligible latency. Although the communication connection may contain several intermediate nodes, the real time communication data typically goes from source to destination without being stored anywhere.

A MSC-S 50 communicates with a MGW 52 using H.248 signaling 80. The MGW 52 establishes a connection between a radio access network (RAN) 55 and a core network (CN) 56. In the H.248 connection model, the MSC-S 50 chooses MGW 52 to handle the call. The MSC-S 50 instructs the MGW 52 via an "add request" to establish a new context. Furthermore, the MSC-S requests to add the terminations labeled T1 and T2 to the context. They are associated with routing ports 20, 21 with a internet protocol (IP) address a IP port. Here a MGW 50 is statically configured into the network and has to be included in the call routing.

In further detail, T1 represents the interface, e.g., a routing port with associated transport address consisting of IP address and IP port number, towards the IP-RAN 55. T2 represents the interface towards the IP CN 56 in a similar way. The context and the terminations are seized and controlled via H.248 protocol signaling 80 in the gateway control protocol (GCP) framework. The connection between the two terminations in the context can be changed and can have the states "not connected", "bothway connected", "oneway connected", i.e., "forward" or "backward". With features such as transcoder free operation (TrFO) and AoIP, the number of tasks performed by MGW 52 is decreasing. While conventionally, e.g., a transcoding between, e.g., pulse code modulation (PCM) in the public switched telephone network (PSTN) and the encoding used in the core network was necessary, standardization and harmonization as outlined has, to a large degree, rendered such transcoding unnecessary. In other words, the data plane handling role of MGW 52 is diminishing over time and in the presented scenario may be close to a packet switch with packet data handling functionality.

The lower part of FIG. 1 shows a the mapping of the above described situation to a case according to an embodiment where a split router architecture based on signaling 81 of OpenFlow encoded control messages is used. Here a control entity (CE) 3 controls a network of forwarding elements (FEs) 4a, 4b, 4c. The CE 3 and the FEs 4a, 4b, 4c may also be referred to as a central control entity controlled network 11 of FEs. The routing ports 20, 21 correspond into physical ports of FEs 4a, 4b in the CE controlled network 11. A connection between the IP RAN 55 and the IP CN 56 is established through the network 11. Therefore, in the lower part of FIG. 1, the task of transferring data packets of a call is performed by the network 11 in the split router architecture.

Using the split router architecture, it may be possible to allocate transport addresses and call processing resources dynamically in the most proper way for each call. It is not necessary to use statically configured nodes, e.g., in the form of MGWs. This allows to increase the flexibility in the call routing. In the lower part of FIG. 1, assuming the case of a transcoder-free call in the Global System for Mobile Communications, GSM using AoIP interface, the CE 3 may allocate a process for example on FE 4a to manipulate the source and destination transport addresses, i.e., IP address and IP port. This will be explained in greater detail with respect to FIGS. 10-12 below.

Figure 2:
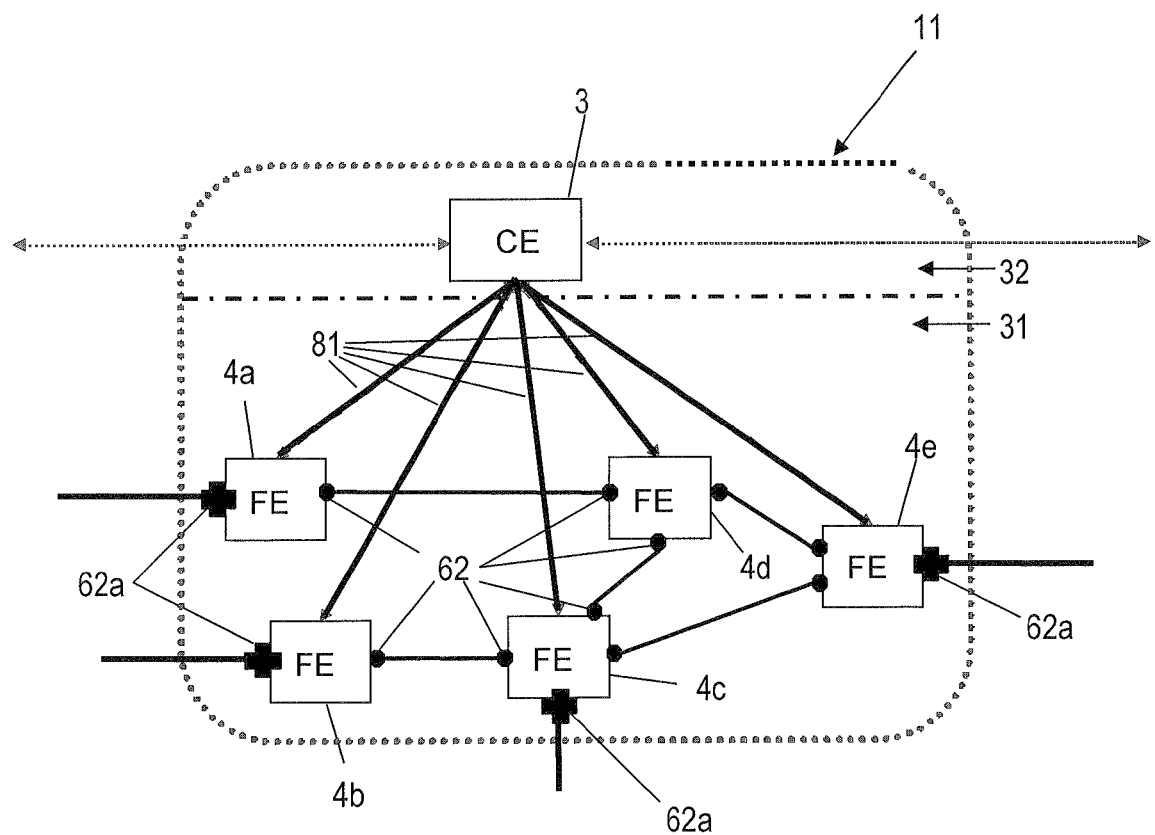
FIG. 2 is a schematic illustration of central control entity controlled network of forwarding elements.

FIG. 2 further illustrates a split router architecture, i.e., a network 11 controlled by CE 3, in which a router is split into two elements. For example, this may be accomplished in accordance with the ForCES Standard. The split router architecture may support OpenFlow and ForCES and a protocol for real time management of the central control entity controlled network and a combination of these protocols. The split router architecture comprises a control element (CE) responsible to manage the routing protocol and the connectivity of the data plane. The control element controls the data plane connectivity through the forwarding elements (FE).

the forwarding element (FE) responsible to forward traffic in the data plane, the forwarding element establishing the connectivity to neighbour nodes based on instructions received from the control entity.

In FIG. 2, a CE 3 controlled network 11 of FE nodes 4a-4e is depicted. The CE 3 controls a network of FE nodes 4a-4e via control signaling 81. Control signaling 81 occurs using a protocol language comprising elements selected from the group consisting of OpenFlow, ForCES, and a protocol for realtime management of the CE controlled network 11.

In this sense, the CE 3 resembles the control plane 32 and the FE nodes 4a-4e resemble the data plane 31. The data plane 31 is sometimes referred to as the user plane. In one embodiment, the FEs 4a-4e can be implemented in the form of switches. The FE nodes 4a-4e are connected to each others by transport links between so-called internal ports 62. The FE nodes 4a, 4b, 4c, 4e are connected to external nodes outside of the CE controlled network 11 by external ports 62a. Such external nodes can utilize the transport services of the CE controlled network 11 by sending data flows to the external FE ports 62a with identifications recognized by the CE 3. For such data from an external node, a certain transport service of the CE controlled network 11 is either pre-configured or is configured on the fly when the data is incoming. The CE 3 configures and controls using signaling 81 the various transport services based on the incoming flow identifications.

The CE controlled network 11 of FEs can be controlled by different routing protocols, such as the local distribution protocol (LDP), the open shortest path first (OSPF) protocol, or the Border Gateway Protocol (BGP). This is indicated in FIG. 2 using dotted horizontal arrows connected to the CE 3.

As discussed with respect to FIG. 1, such a CE controlled network 11 of FEs can be used to transfer data packets of a real time communication service of a call in the CS domain of the core network. Then the packetized CS traffic may reuse the packet transport infrastructure provided by a CE controlled network.

Figure 3:
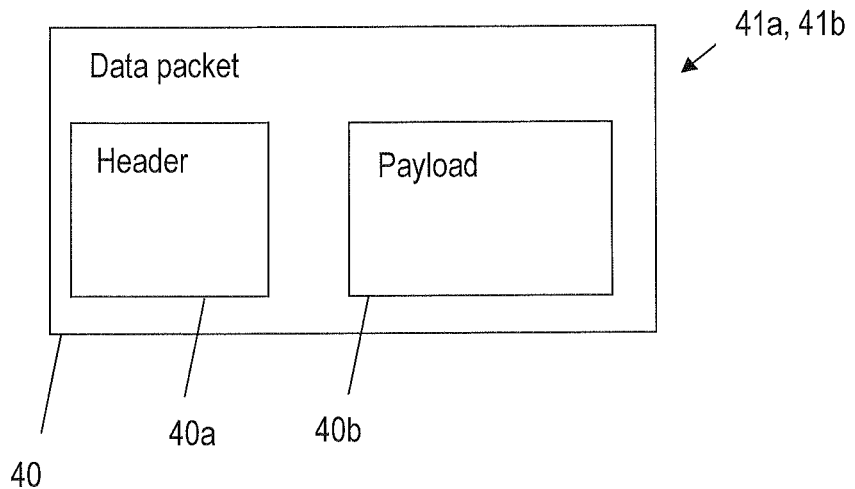
FIG. 3 is a schematic illustration of a data packet.

In FIG. 3, a data packet 40 is illustrated. As illustrated, the data packet 40 consists of a header 40a and payload 40b. The payload can contain various contents, which is typically embedded in other transport or framing protocols, for example voice data of a call or data corresponding to real time communication services.

In embodiments as explained herein, data packets can also be used in the context of first and second control data 41a, 41b. While the first control data 41a can be encoded in the H.248 protocol language where GCP data packets are used, the second control data 42a can be encoded in a protocol language comprising elements selected from the group consisting of: OpenFlow, ForCES, and a protocol for realtime management of the central control entity controlled network.

In order to take into account that data packets encoded in one protocol language may not be readily processed by an interface adapted to process data packets encoded in another protocol language, a routing system according to an embodiment is provided with a converter.

Figure 4:
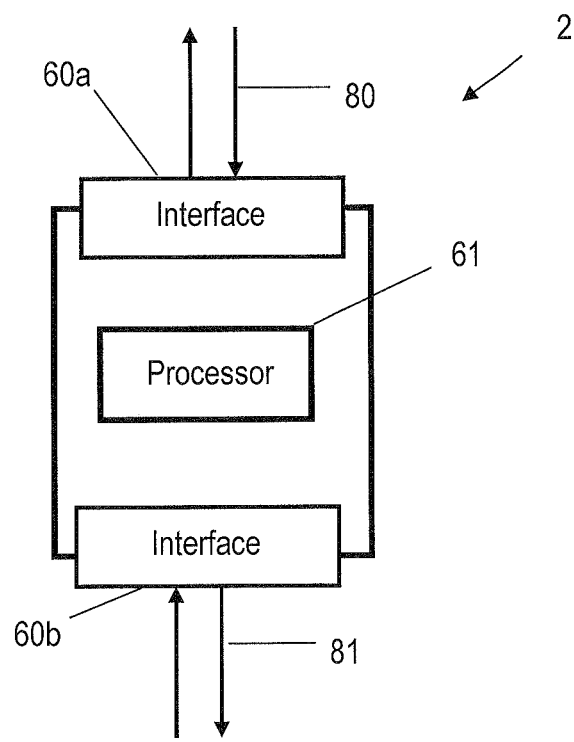
FIG. 4 is a schematic illustration of a converter.

In FIG. 4, converter 2 consists of two interfaces 60a, 60b and a processor 61. The converter 2 is configured to receive signals 80 containing media gateway control protocol encoded first control data 41a via interface 60a, to process the first control data 41a to obtain second control data 41b, and to provide signals 81 containing second control data 41b, using processor 61 to a central control entity via interface 60b.

In a scenario as discussed with respect to FIG. 1, lower part, employing such a converter 2 may allow to keep a MSC-S unchanged and use the converter as a mediator between the H.248 protocol supported in the MSC-S or in another node using the H.248 protocol, e.g. a Media Gateway Control Function (MGCF), and the split router architecture.

In addition to the protocol conversion as explained above, the converter may perform additional functions. The converter 2 in FIG. 4 receives H.248 Gateway Control Protocol (GCP) encoded messages from a MSC-S via interface 60a. The converter 2 can reply via interface 60a. Depending on the GCP message sequence, i.e., the GCP procedure, the processor 61 of the converter 2 is configured to process the first control data to obtain second control data, i.e., to generate OpenFlow messages to configure a connection service for a user, e.g., a MSC-S, through the CE controlled network, i.e., the CE Domain. For this, the OpenFlow encoded messages are provided via interface 60b to a CE.

Figure 5:
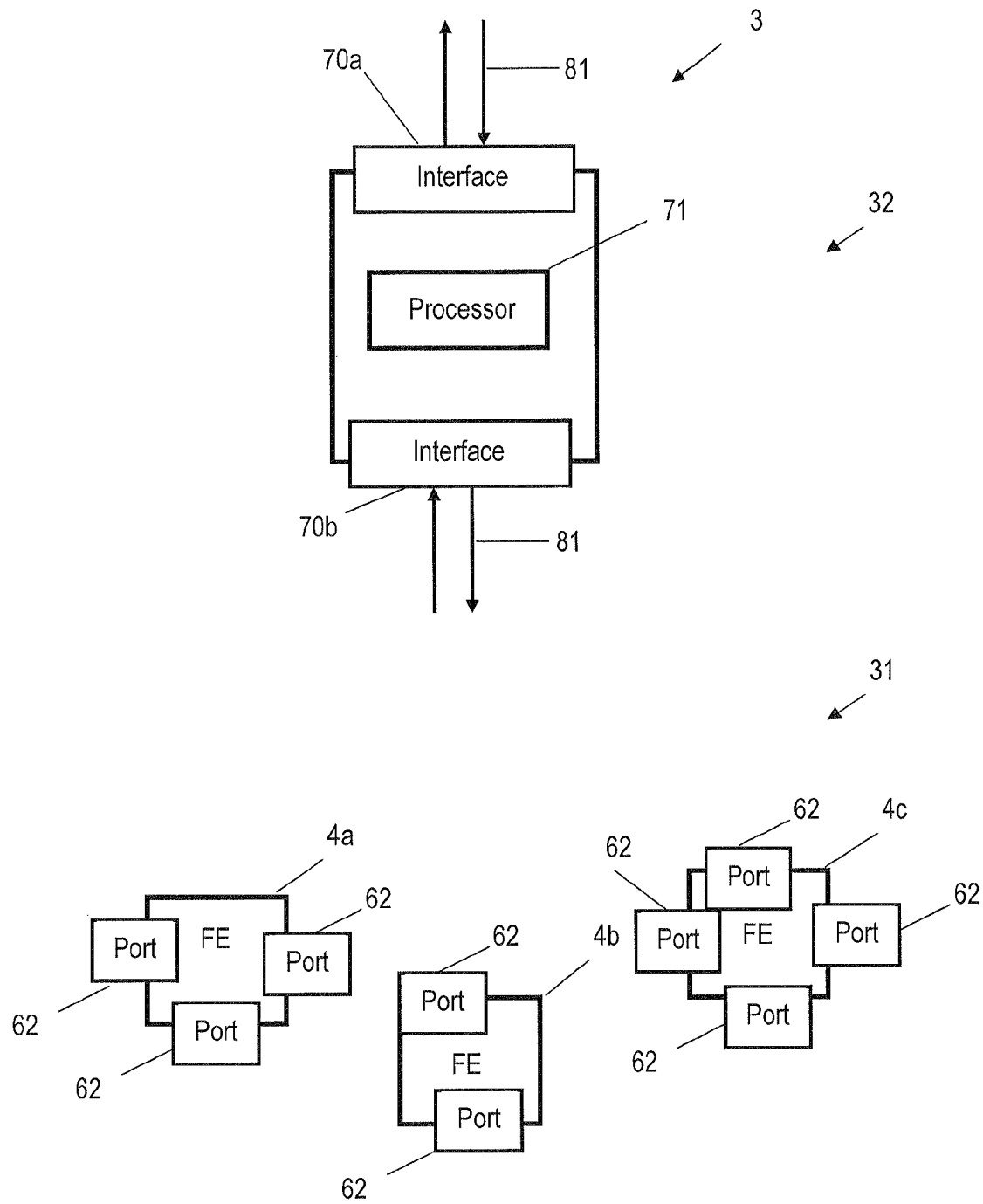
FIG. 5 is a schematic illustration of a central control entity and of forwarding elements.

Such a CE 3 is depicted in FIG. 5 upper part. The CE3 consists of two interfaces 70a, 70b and a processor 71. Interface 70a is configured to receive signaling 81 containing second control data which can be encoded in OpenFlow or ForCES or the like. For example, the second control data can be received from a converter as discussed with respect to the preceding FIG. 4.

The CE 3 is located in the control plane 32 of a CE controlled network as discussed with respect to FIG. 2. The CE controlled network further comprises forwarding elements (FEs). FEs 4a, 4b, 4c are depicted in FIG. 5 lower part. Based on the second control data, processor 71 controls the FEs 4a, 4b, 4c via signaling 81 of OpenFlow encoded messages sent via interface 70b to the FEs 4a, 4b, 4c. The FEs 4a, 4b, 4c have ports 62 as discussed with respect to FIG. 2. These ports enable to establish a media pathway allowing for transport of data packets through the CE controlled network of FEs.

Turning back to FIG. 4, the processor 61 of the converter 2 can be further configured to control the CE 3 of FIG. 5 to allocate processing resources inside the CE controlled network of FIG. 5 to provide the required flow processing in the form of data plane application as indicated by the GCP messages. Such data plane applications may comprise, but are not limited to: tone and announcement generation, transcoding, multi-party devices, echo cancellation, noise reduction, volume level adjustment, and transport protocol termination, or packet framing conversion.

The converter 2 can be co-located with a MSC-S, e.g., the MSC-S 50 of FIG. 1, with a MGW, e.g., with the MGW 52 of FIG. 1, with a CE, e.g., the CE 3 of FIG. 1, or as a stand alone node. When located within a CE, the converter 2 may readily query the FE topology information which is stored and managed in the CE. Further the converter 2 may be entitled to configure transport services on the FEs in form of the connectivity between two external FE ports valid for a specific data flow representing a CS call in this context. If the converter 2 is co-located with a CE 3, for example port 60b of FIG. 4, as well as port 70a of FIG. 5, can be internal ports. Furthermore, if the converter 2 is co-located with a CE 3, this can happen via execution of software code on a single processing unit. Then the above mentioned ports may be implemented as part of the software code.

FIGS. 6-9 describe embodiments relating to different network scenarios in mobile communication networks 10. Such network scenarios can involve one MSC-S, e.g., as in FIG. 7, or two MSC-Ss, e.g., as in FIGS. 6, 8, 9, in a call from a first party, hereinafter referred to as A-party, to a second party, hereinafter referred to as B-party. Also the number of involved CE nodes can vary depending on the scenario.

Figure 6:
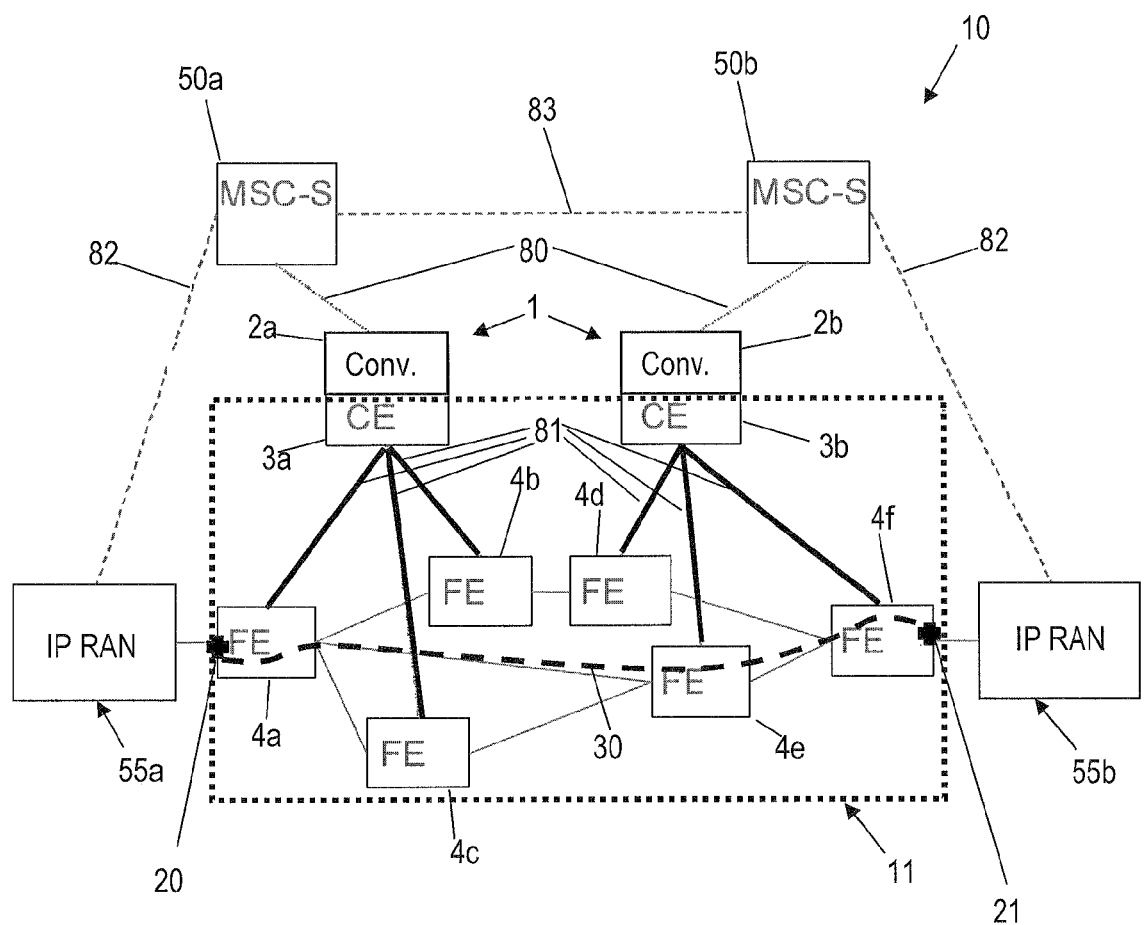
FIG. 6 is a schematic illustration of central control entity controlled network of forwarding elements transferring data packets between two radio access networks.

In FIG. 6, each of two CEs 3a, 3b controls a part of the packet network constructed of FEs 4a, 4b, 4c, 4d, 4e, 4f, i.e., the CE controlled network 11, and further controls the connectivity between these FEs. This controlling occurs via, e.g., OpenFlow or ForCES encoded signaling 81. To this respect, the domain of CE 3a consists of the FEs 4a, 4b, 4c, whereas the domain of CE 3b consists of the FEs 4d, 4e, 4f. The CE controlled network 11 is used to establish a connection between a first and a second radio access network (RAN) 55a, 55b. RAN signaling 82 between those RANs 55a, 55b and the MSC-S 50a, 50b is used to, e.g., establish and terminate a call.

Further inter-MSC-S call control signaling 83 between the MSC-S is indicated. Also signaling 83 can be used to, e.g., establish and terminate a call.

Each of MSC-S 50*a*, 50*b* is controlling one CE 3*a*, 3*b* using first protocol data encoded in the H.248 protocol. The respective signaling 80 is indicated. Converters 2*a*, 2*b* are co-located with the CEs 3*a*, 3*b*, respectively. The converters 2*a*, 2*b*, which are labeled "Cony.", together with the CEs 3*a*, 3*b* form a routing system 1. It should be understood that the converters 2*a*, 2*b* can also be stand alone nodes, or can be co-located with the MSC-Ss 50*a*, 50*b*, respectively, e.g., as discussed with respect to FIGS. 4 and 5.

The converters 2*a*, 2*b* are configured to convert the H.248 connection model into the OpenFlow concept of flow tables as was discussed with respect to the mapping indicated in FIG. 1. The concept of the flow tables is that they are controlled and configured by one CE and executed in distributed FEs. The flow tables are executed in distributed entities, in the embodiment of FIG. 6 in the form of the FEs 4*a*, 4*b*, 4*c*, 4*d*, 4*e*, 4*f*.

In FIG. 6, a static pathway 30 is established through the network 11 of FEs 4*a*, 4*b*, 4*c*, 4*d*, 4*e*, 4*f* between the first and the second radio access network 55*a*, 55*b* of a mobile communications network 10. The term "static pathway" can refer to a tunnel or pseudo-wire connection, also known as E-line, established between a first and a second external port 20, 21 of FEs 4*a*-4*f* of the FE controlled network. This tunnel or pseudo-wire connection is established statically along certain FEs 4*a*, 4*e*, 4*f* of the network 11 for the duration of the call, hence the term static pathway. Such a static pathway typically does not fully occupy physical resources for the time it is established. This is because only certain data packets belonging to the call are associated with the static pathway. Then each FE may also provide further data transferring tasks, e.g., in connection with further static pathways or other tasks for different data packets, while a certain static pathway is established. A first routing port 20 with an associated first transport address corresponds to an external port of FE 4*a*. A second routing port 21 with an associated second transport address corresponds to an external port of FE 4*f*.

For the time of the call, the CEs 3*a*, 3*b* control via signaling 81, e.g., encoded in OpenFlow or ForCES, the FEs 4*a*, 4*b*, 4*c*, 4*d*, 4*e*, 4*f* such that data packets, being identified, e.g., via their originating and target IP addresses and/or via a media control access (MAC) address, as belonging to the call, are forwarded along this static pathway through the CE controlled network 11.

After the call has ended, the CEs 3*a*, 3*b* can be configured to delete the static pathway, i.e., by canceling via signaling 81 the respective transport services in the FEs. Also it is possible that the static pathway is associated with a time-out. For example, each FE 4*a*, 4*b*, 4*c*, 4*d*, 4*e*, 4*f* may be instructed by the CEs 3*a*, 3*b* via signaling 81 to execute a transport service, i.e., to transfer data packets along the static pathway, only until the time-out is triggered. For example, the timer can be reset by each packet received with the static pathway. If the call ends, the time-out is eventually triggered by the fact that no more packets traverse through the static pathway and the static pathway 30 is cancelled.

With respect to FIG. 6 it should be clear that it is not necessary to involve a MGW in the handling of the call according to this scenario. The tasks of maintaining a call connection and performing switching functions are performed by the converters 2*a*, 2*b* in connection with the CE controlled network 11. In particular, the CEs 3*a*, 3*b* can determine the static pathway 30 such that it is aware of data traffic congestions and service controls. This allows to optimize the routing of data traffic for a number of different calls using the same CE controlled network.

Figure 7:
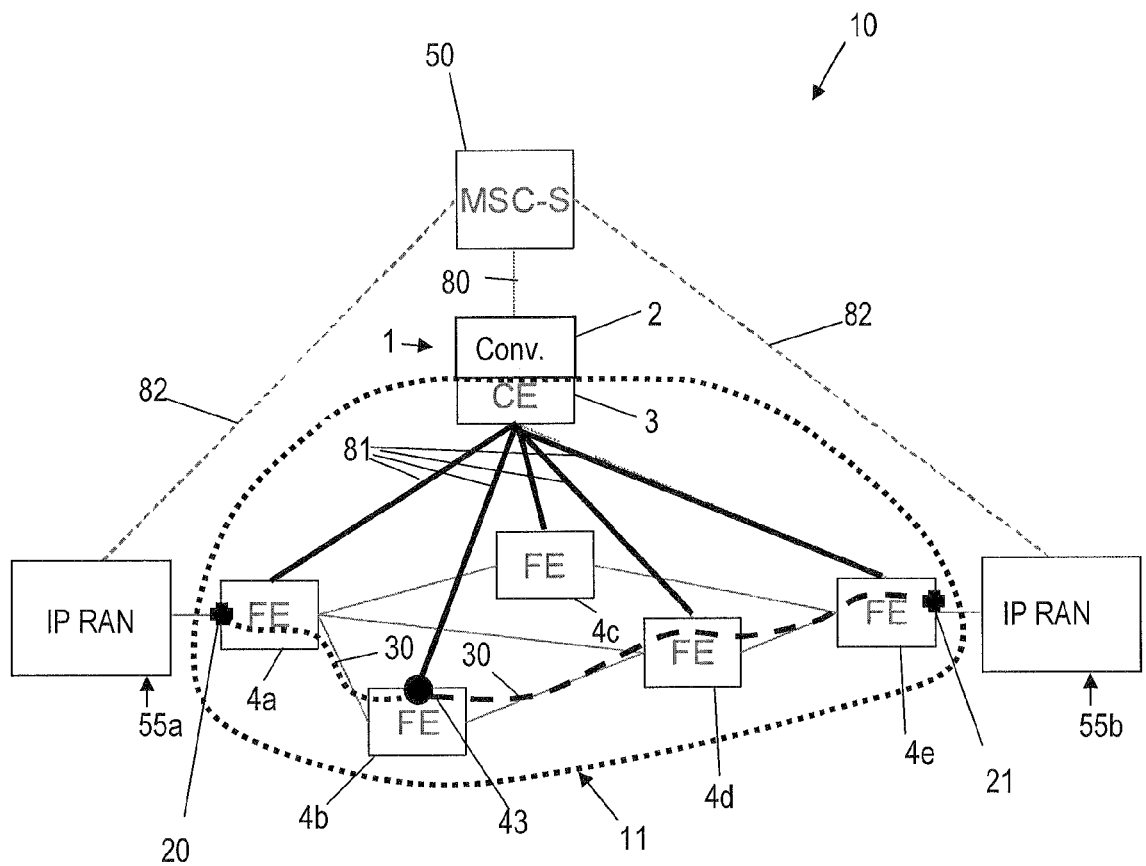
FIG. 7 is a schematic illustration of central control entity controlled network of forwarding elements transferring data packets between two radio access networks.

With respect to FIG. 7, a further network scenario in a mobile communications network 10 is illustrated. In this embodiment the entire call between A-party and B-party is handled in a single MSC-S 50, i.e., A- and B-party are served by this single MSC-S 50. Inter-MSC-S call control signaling may not be necessary. Also, MSC-S 50 controls a single CE 3. Again a converter 2 is co-located with the CE 3, however can be located differently. An embodiment as illustrated in FIG. 7 using a single MSC-S 50 can occur for a call between A-party and B-party residing in the same radio access network, which is known as local switching. If this is the case, it is possible that no transcoding data plane applications or the like have to take place and the FEs perform merely the function of packet switches.

However, in FIG. 7, A-party is connected to IP RAN 55*a* and B-Party is connected to IP-RAN 55*b*. In this scenario, these RANs 55*a*, 55*b* use different encoding. Therefore, static pathway 30 comprises a data plane application 43 taking place at FE 4*b*. For example, the CE 3 is instructed by converter 2 to determine the static pathway such that the data plane application is performed by a certain FE. Examples for data plane applications comprise, but are not limited to: tone and announcement generation, transcoding, multi-party devices, echo cancellation, noise reduction, volume level adjustment, and transport protocol termination, or packet framing conversion. The CE 3 queries the network 11 structure and determines a suitable FE 4*b*. The CE 3 then determines the static pathway 30 accordingly such that it comprises the FE 4*b*., e.g., the FEs report their capabilities to the CE 3 at an initial audit.

Generally, a certain data plane application may be performed by a specialized FE. Different calls, which all rely on the execution of the certain data plane application can then all be established by respective CEs such that their respective static pathway comprises the specialized FE. By this it becomes possible to centralize services such as data plane applications, e.g., transcoding.

Data plane application 43 in the embodiment of FIG. 7 relates to transcoding. This means the data packets containing, e.g., voice data of the call are converted from a first codec to another codec. A situation where transcoding is necessary can be that the call needs to be interworked towards another network using a different voice encoding.

Figure 8:
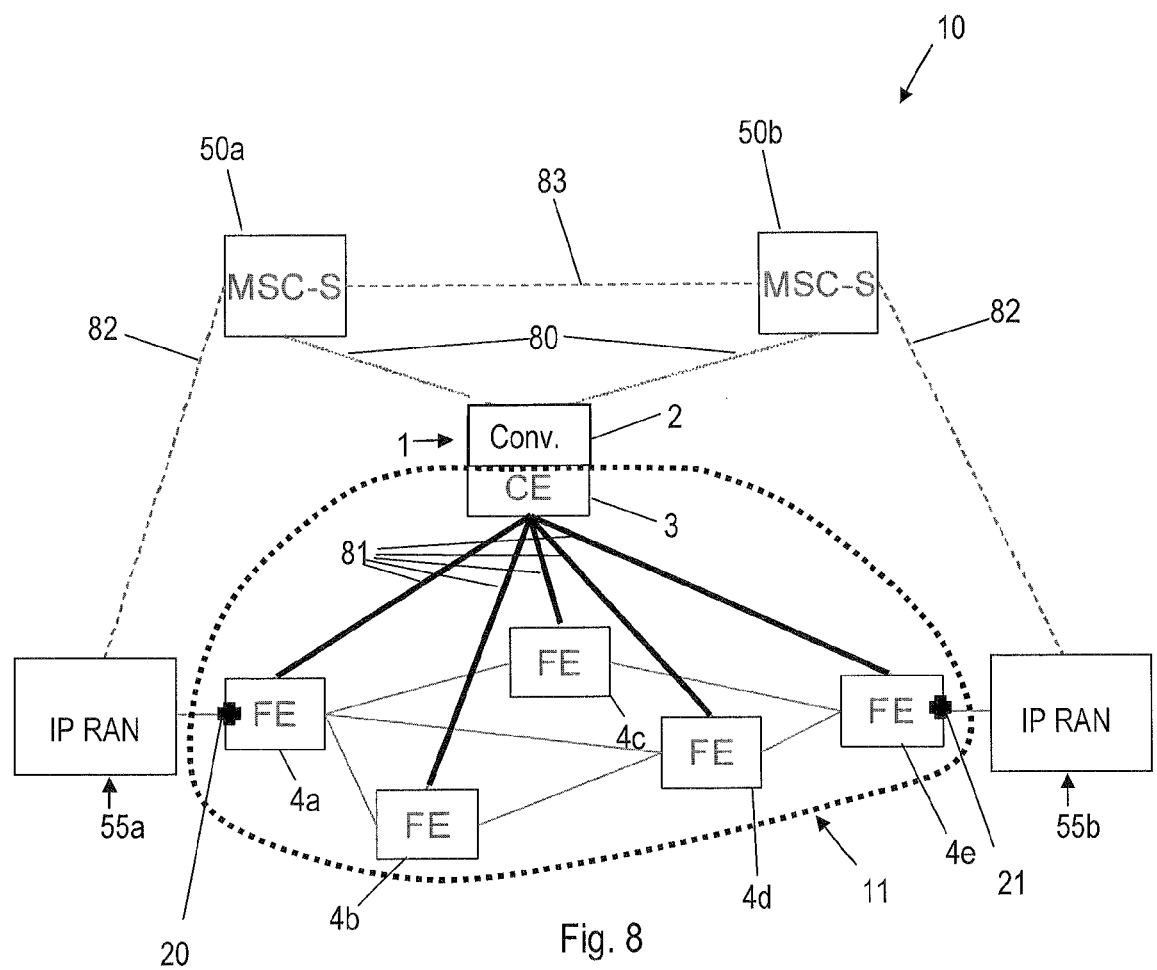
FIG. 8 is a schematic illustration of central control entity controlled network of forwarding elements transferring data packets between two radio access networks.

In FIG. 8, the entire call between A-party and B-party is handled by two different MSC-S 50*a*, 50*b*, i.e., A-party and B-party are served by different MSC-Ss. Both MSC-Ss 50*a*, 50*b* control the same CE 3 via converter 2.

Figure 9:
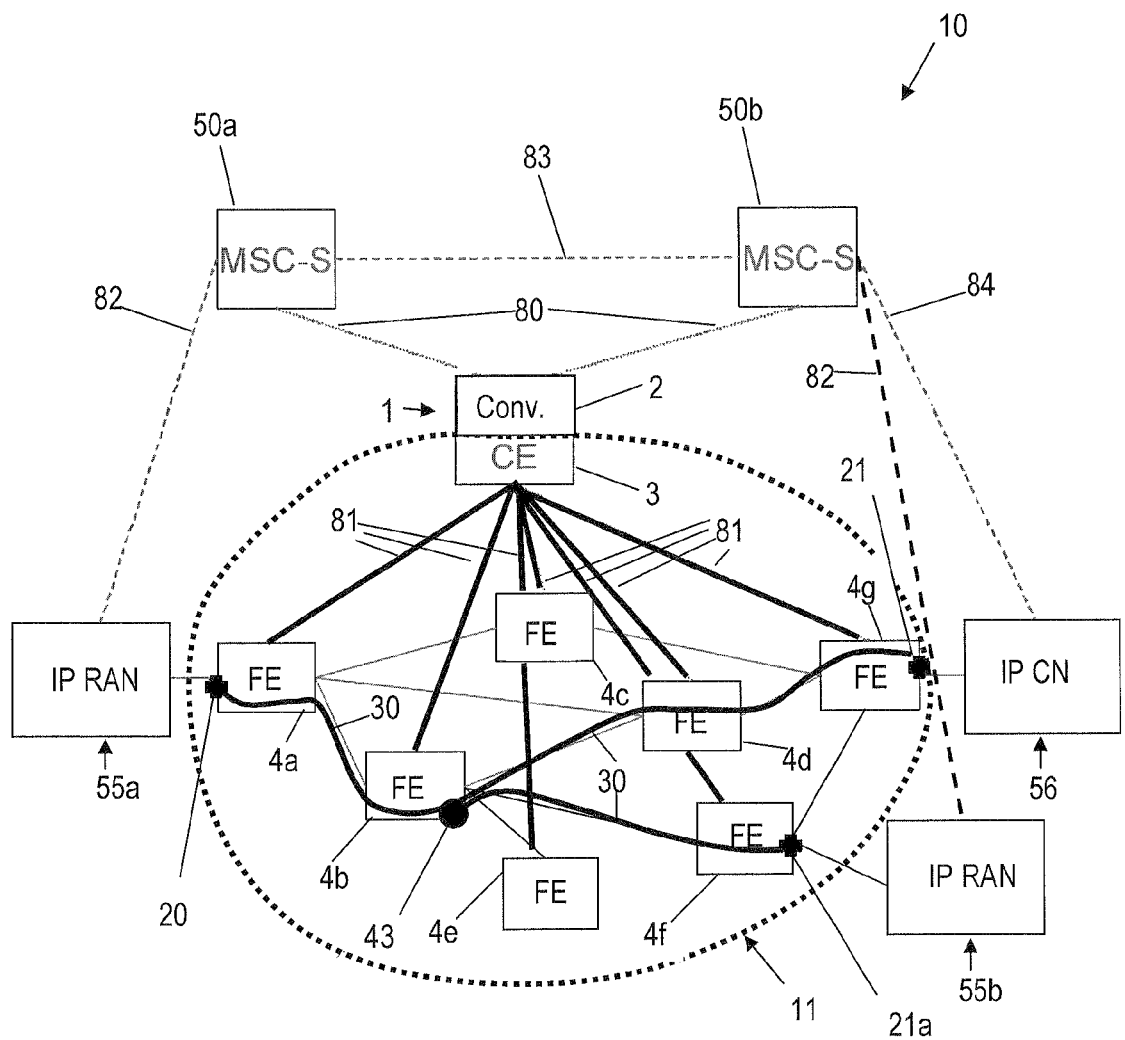
FIG. 9 is a schematic illustration of central control entity controlled network of forwarding elements transferring data packets between two radio access networks and a core network.

In FIG. 9 a further embodiment of a routing system in a mobile communications network 10 comprising a data plane application 43 is given. The data plane application 43 in FIG. 9 allows to have a multi-party call. Then the static pathway 30 has three ends connecting to a first and a second radio access network 55*a*, 55*b* and to a further core network 56. The data plane application 43 located at FE 4*b* connects the three legs of the static pathway 30 with each other. Core network signaling 84 between IP CN 56 and MSC-S 50*b* is indicated. As discussed with respect to FIG. 8, a single CE 3 is controlled by two MSC-Ss 50*a*, 50*b* via converter 2.

Figure 10:
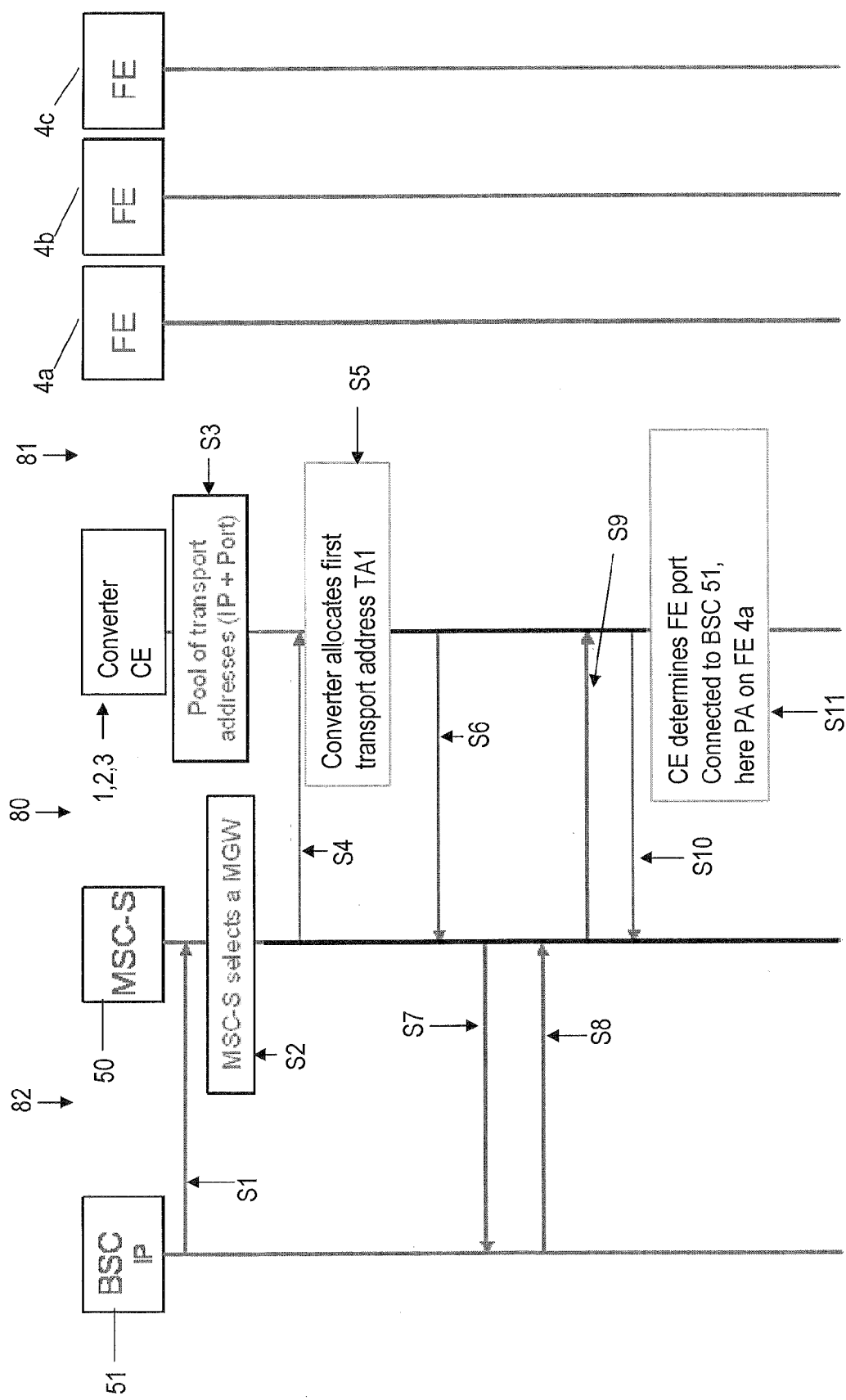
FIG. 10 is a signaling diagram illustrating communication between a BSC, a MSC-S, and a routing system.
Figure 11:
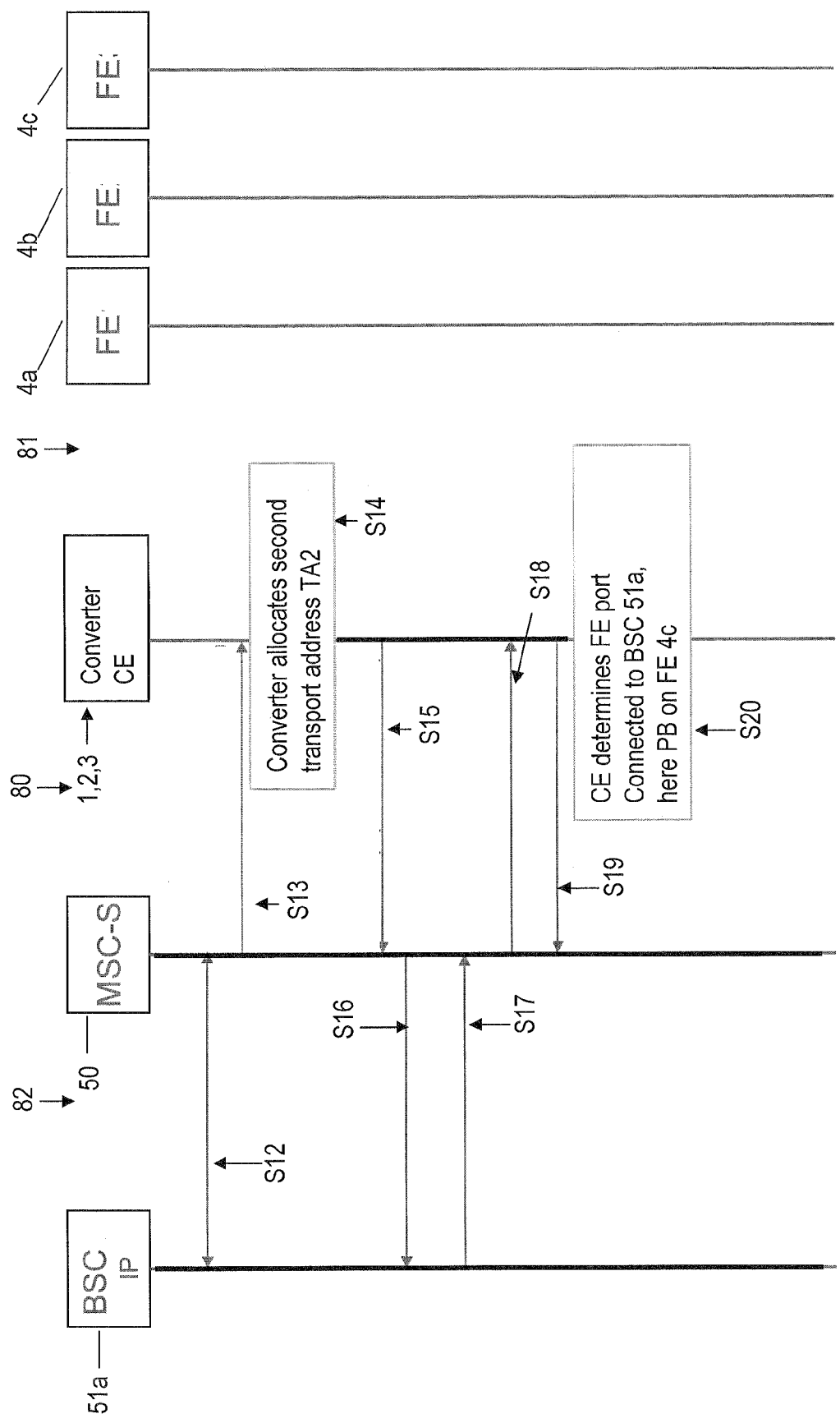
FIG. 11 is a signaling diagram illustrating communication between a BSC, a MSC-S, and a routing system.
Figure 12:
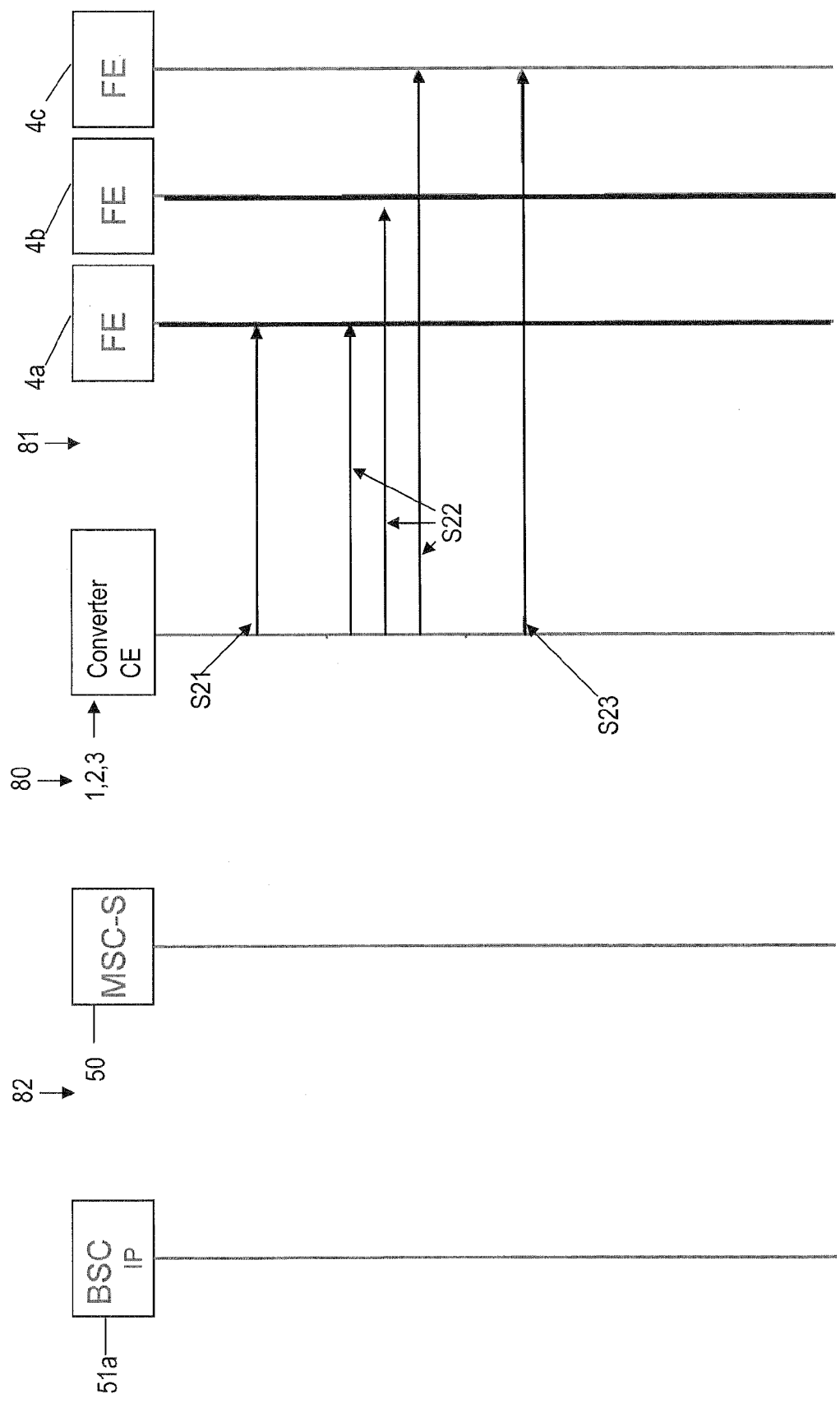
FIG. 12 is a signaling diagram illustrating communication between a BSC, a MSC-S, and a routing system.

In FIGS. 10-12, a signaling diagram is shown to further illustrate the embodiment of FIG. 7, where a single MSC-S 50 communicates with a single converter 2 and CE 3. For a call between A-party and B-party, a static pathway is established through the CE 3 controlled network of FEs 4*a*, 4*b*, 4*c*. FIGS. 10-12 illustrate in further detail if compared to FIG. 1 how to map H.248 messages to OpenFlow at a call setup from an IP based base station controller (BSC) in the case of AoIP.

First, in step S1, the call starts with BSC 51 forwarding its call setup request to the MSC-S 50 via RAN signaling 82. The MSC-S 50 seizes termination T1, the termination towards the BSC 51. The MSC-S can reply with a call proceeding message which is not shown in FIG. 10.

In step S2, based on the call request of step S1, the MSC-S 50 chooses an appropriate MGW to handle the call. In the embodiment, the MGW is replaced by a routing system 1 comprising a converter 2 and a central control entity 3. However, the MSC-S 50 can function according to the 3GPP Release 4 standard. The routing system handles a pool of transport addresses which it can use for data transferring tasks, see step S3.

The MSC-S 50 issues an "add" request command via H.248 encoded signaling 80 to the routing system 1 in step S4. The MSC-S 50 requests a traffic channel. By doing so, the MSC-S 50 instructs to establish a new context and places a termination in that context. This "add request" is a gateway control protocol (GCP) encoded H.248 first control data message.

In step S5, based on the received first control data, the converter 2 allocates a first transport address TA1, i.e., IP address and IP port number as termination property. The converter 2 allocates one of the transport addresses, i.e., IP address and IP port number, from the pool and replies it in step S6 to the MSC-S 50. This transport address identifies a virtual external port in the network of FEs 4a, 4b, 4c controlled by the CE 3 and is bound to a physical port later on in step S11. The first transport address TA1 can be used by the peer node, i.e., BSC 51, to route traffic towards the network of FEs 4a, 4b, 4c controlled by CE 3.

Then, in step S6, the converter 2 replies with an "add" reply, containing identifiers for the new context and the termination created. Here the terminations correspond to the virtual external ports of the CE controlled network. Also the first transport address TA1 is included.

It should be noted that the first control data received in step S4 is not processed synchronously by converter 2 to obtain second control data, e.g., encoded in openFlow protocol, immediately after step S4. Rather the converter asynchronously delays this processing to obtain second control data until step S11. After step S4, the converter 2 first performs certain tasks, represented by steps S5, S6, S9, S10 without involving the CE 3 addressed via OpenFlow encoded signaling 81. The selection whether the received first control data is processed synchronously or asynchronously depends on the content of the received first control data.

In step S7, the MSC-S 50 sends a traffic channel assignment request containing the transport address allocated in step S5 to the BSC 51. Once the radio bearer is established, the BSC 51 replies in step S8 with information on the assigned traffic channel, i.e., radio node. The BSC 51 replies its own IP address in Assignment Complete Message to the MSC-S 50 in step S8. MSC-S 50 sends this information down to the converter 2 in step S9. In particular this information comprises the BSC transport address. This information is forwarded to the converter 2 in step S9 in the form of a "mod" request linking the radio node transport address with the context and the appropriate termination. In step S10, the converter replies with a "mod" reply.

In step S11, the CE 3 has to select the FE and the port to be used as connection end point, i.e., a termination towards the peer node, in the current scenario a radio node. To this respect, FEs 4a, 4b, 4c can be configured to forward incoming packets, which cannot be matched to any existing flow definition, to the CE 3. The flow definitions are programmed by the CE 3 into the FEs 4a, 4b, 4c. Consequently, the CE 3 will receive the first packet of the call, identified by the allocated transport address TA1, and can then bind this transport address to the physical port of the particular FE, where the packet was received. This port will become the entrance to the routing service. It is important to note that this selection is done after the radio node provides its transport address in step S8. In the case of FIG. 10, this is a port "PA" on FE 4a.

The converter has to repeat this procedure of steps S1-S11 relating to the call incoming side for the call outgoing side. In particular, a second termination needs to be placed in the context established in step S4. This is shown in FIG. 11, where, for the call outgoing side, a BSC 51a handling B-party communicates with the MSC-S 50. Depending on the network scenario, see FIGS. 6-9, one or more MSC-S can be involved in the call. For example, via inter-MSC-S call control signaling 83, see e.g., FIG. 9, a remote MSC-S can be determined which then communicates with remote BSC 51a. It should be understood, that in more complex cases also multiple incoming and outgoing call legs are possible, see FIG. 9.

In step S12, the MSC-S 50 pages B-Party's mobile terminal via BSC 51a. Once the terminal is located, MSC-S 50 selects an appropriate MGW, i.e., in the current scenario a routing system 1. In the present scenario, the same routing system 1 as for the originating call leg is seized.

In step S13, a further termination is placed in the context established in step S4 via an "add" request discussed with respect to step S4. MSC-S 50 seizes termination T2 in the same context as T1.

In step S14 the converter 2 allocates a second transport address TA2 from the pool of handled transport addresses for the new termination. Step S14 corresponds to step S5. The converter 2 sends back the second transport address TA2 as allocated for the termination T2 in step S15.

Next, steps S15-S20 correspond to steps S6-S11, but with respect to B-Party's BSC 51a and the second termination labeled T2. In particular, in step S20, the CE 3 maps a physical port of a FE, in the case of FIG. 10 port PB on FE 4c, to the virtual external port associated with the second transport address TA2 allocated in step S14 by the converter 2 as explained above with respect to step S11.

In steps S11 and S20, physical FE ports PA and PB have been associated with the first and second routing ports for which transport addresses have been allocated and communicated to the BSCs 51, 51a. The ports correspond to a first and a second end of a static pathway through the CE controlled network of FEs 4a, 4b, 4c.

It should be understood that the first and the second transport addresses allocated in steps S5 and S14 can be the same, e.g., if only one FE is involved or other specific situations. This particularly may depend on the number of transport addresses available in the pool of transport addresses, see step S3.

In FIG. 12, in steps S21 and S23, the external ports PA, PB of the CE controlled network are configured such that incoming and/or outgoing data packets are correctly transferred to the respective network nodes, here BNCs 51, 51a, as negotiated in steps S7, S8, S16, and S17. This occurs via signaling 81 encoded in OpenFlow or ForCES or the like. For example, a connection service is configured on FE 4a in order to map traffic towards the first transport address TA1 on transport service X and vice versa. A further connection service is configured on FE 4c to map traffic towards the second transport address TA2 on transport service X and vice versa. Hence, in step S21, the CE 3 configures on the port PA on FE 4a the connection service point. All traffic incoming towards transport address TA1 is mapped on an internal transport service X and other way around. Then internal transport service X is configured between FE 4a and FE 4c.

In steps S22, the CE 3, via signaling 81 encoded in OpenFlow or ForCES or the like, has to select the static pathway between the ends. A transport service is configured between port PA on FE 4a and port PB on FE 4c. This can be done in form of a Pseudo-Wire connecting the external ports representing the terminations or in form of an Ethernet Local Area Network (E-LAN) connecting multiple terminations. Because this connection is static for the duration of the call, it is referred to as static pathway. It should be understood that as compared to a conventional local area network (LAN), unidirectional connections may need to be supported to represent one-way connections of the context model.

In the scenario illustrated in FIG. 12, the CE 3 controls via OpenFlow the three FEs 4a, 4b, 4c to set-up a static pathway. The static pathway reflects the connection between the terminations T1 and T2 as requested in steps S4 and S13. T1 is mapped on the port of FE 4a with the proper transport address and T2 is mapped on the port of FE 4c. In this scenario the static parthway passes FE 4b.

Optionally, in step S22, the CE 3 allocates computing resources, e.g., in the form of "Logical Function Blocks" as defined in ForCES, to process the packets of the data plane flow. In one embodiment this implies manipulation of incoming and outgoing transport addresses, e.g., in the case of an AoIP connection or a transcoder free call. In other cases protocol termination has to be provided e.g., in a Iu connection or transcoder resources have to be provided. Such data plane application have been discussed with respect to FIGS. 7 and 9.

In step S23, the connection service exit point is configured on FE 4c. All traffic leaving the internal transport service X, see above, is mapped to the connection PB on FE 4c leaving from transport address TA2. Incoming traffic towards TA2 is mapped to transport service X.

The internal transport service X set up in steps S21-S23 can be associated with a time-out. Then if the time-out is not reset anymore during the active call, transport service X will terminate once the time-out is triggered. Another option is that when the call ends CE 3 instructs the FES 4a, 4b, 4c 1 to terminate transport service X. This means that the call processing resources are dynamically allocated for the duration of the call.

Figure 13:
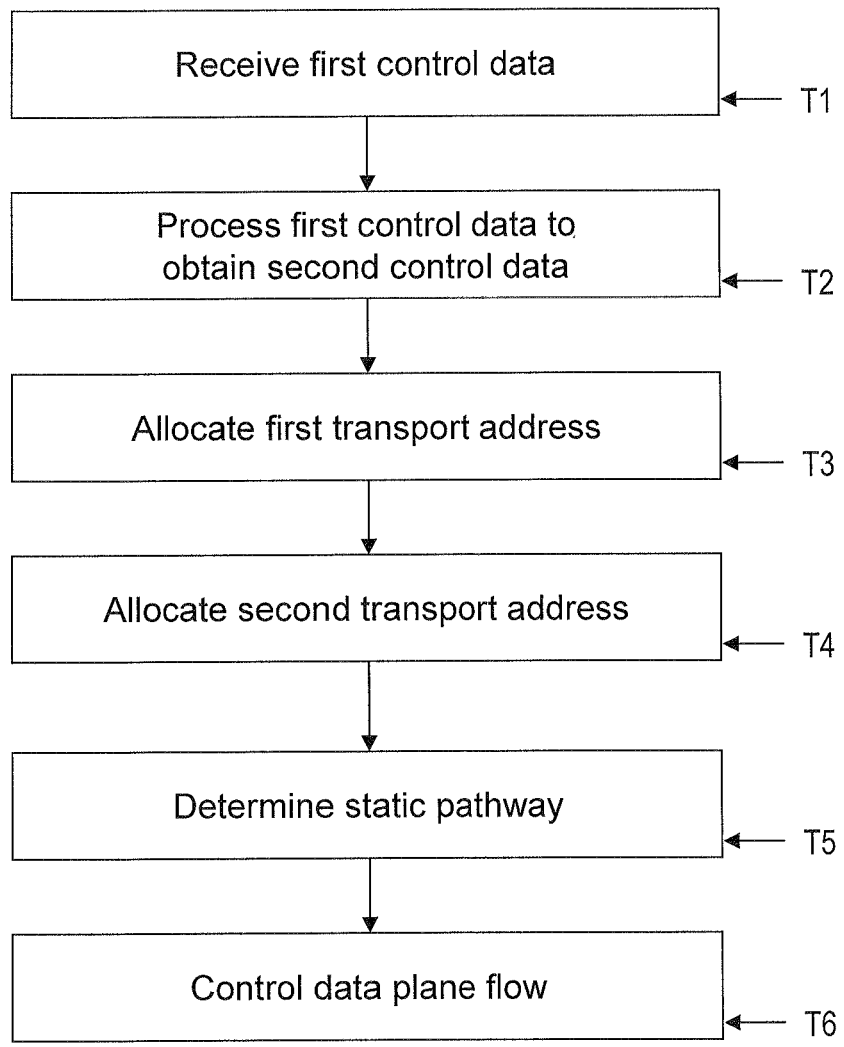
FIG. 13 is a flowchart illustrating a method according to an embodiment.

FIG. 13 shows a flowchart for illustrating a method according to an embodiment of the invention. The method may be used in a routing system as explained above. First, in step T1, first control data is received. The first control data is media gateway control protocol encoded, i.e., in the H.248 standard. The receiving of control data in step T1 occurs via an accordingly adapted interface of a converter.

Next, in step T2, the first control data is processed by a processor of the converter in order to obtain second control data. The second control data is encoded in, e.g., OpenFlow or ForCES or a combination thereof.

The processing of the first control data of step T2 can occur synchronously or asynchronously. The processor selects whether to process synchronously or asynchronously based on the content of the first control data.

Next, in step T3, a first transport address is allocated by the processor of the converter for a first routing port. The transport address consists of an IP address and an IP port. It is used to route incoming data packets containing data of the call to and from a first end of a network.

Likewise, in step T4, a second transport address is allocated by the processor of the converter for a second routing port. It is used for routing data packets to and from a second end of the network. The transport addresses allocated in steps T3 and T4 are determined from a pool of transport addresses which are handled by the converter. The first and second routing ports can be associated with virtual ports of the network.

In step T5, a processor of a central control entity (CE) determines a static pathway through the network of forwarding elements (FE) which is controlled by the CE. The CE determines the static pathway based on the second control data which was provided to the CE via an interface from the converter. For determining the static pathway, OpenFlow or ForCES encoded control data sent via an interface is used to control the FEs accordingly.

In particular the static pathway is determined such that a first end of the static pathway corresponds to the first routing port and a second end of the static pathway corresponds to the second routing port. The ends of the static pathway correspond to physical ports of FEs. Therefore, the first routing port is mapped to a physical port of a FE and the second routing port is mapped to a physical port of a further FE.

Then, in step T6, the processor of the CE controls a data plane flow of a stream of the data packets along the static pathway. For this OpenFlow or ForCES encoded control data sent via an interface is used to control the FEs accordingly.

While devices and methods according to embodiments have been described in detail, modifications may be implemented in other embodiments. For example, a single MSC-S may be used to control more than one CE via converters.

The invention claimed is:

1. A routing system for a mobile communications network for transferring data packets of real time communication services of a call, comprising:
    a converter configured
        to receive media gateway control protocol encoded first control data,
        to process the first control data to obtain second control data,
        to, based on the first control data,
            allocate a first transport address for a first routing port for incoming data packets, and
            allocate a second transport address for a second routing port for outgoing data packets,
    a central control entity controlling a central control entity controlled network of forwarding elements, wherein the central control entity is configured
        to determine a static pathway through the network of forwarding elements based on the second control data, wherein a first end of the static pathway corresponds to the first routing port and a second end of the static pathway corresponds to the second routing port, and
        to control a data plane flow of a stream of the data packets along the static pathway.

2. The routing system according to claim 1, wherein the converter is further configured to reply to the received first control data based on the received first control data.

3. The routing system according to claim 1,
    wherein the converter is configured to dynamically allocate the first transport address and the second transport address for the duration of the call, and
    wherein the central control entity is configured to control the data plane flow of the stream of the data packets along the static pathway for the duration of the call.

4. The routing system according claim 1, wherein the first routing port is a first virtual port of the central control entity controlled network of forwarding elements, and the second routing port is a second virtual port of the central control entity controlled network of forwarding elements.

5. The routing system according to claim 4, wherein the first end of the static pathway is a physical port of a first forwarding element and the second end of the static pathway is a physical port of a second forwarding element.

6. The routing system according to claim 1, wherein the converter is configured to select, based on the first control data, whether processing the received first control data synchronously or asynchronously.

7. The routing system according to claim 1, wherein the central control entity is configured to determine the static pathway such that it comprises forwarding elements performing one or more data plane applications.

8. The routing system according to claim 1, wherein the converter is located within a unit selected from the group consisting of:
a Mobile Switching Centre Server providing the first control data,
a Media Gateway node,
the central control entity, and
a standalone unit.

9. The routing system according to claim 1, wherein second control data is encoded in a protocol language comprising elements selected from the group consisting of: OpenFlow, ForCES, and a protocol for realtime management of the central control entity controlled network.

10. A method for transferring, in a mobile communications network, data packets of real time communication services of a call, comprising:
receiving media gateway control protocol encoded first control data,
processing the first control data to obtain second control data,
allocating, based on the first control data, a first transport address for a first routing port for incoming data packets,
allocating, based on the first control data, a second transport address for a second routing port for outgoing data packets,
determining, based on the second control data, a static pathway through a central control entity controlled network of forwarding elements, wherein a first end of the static pathway corresponds to the first routing port, and a second end of the static pathway corresponds to the second routing port, and
controlling a data plane flow of a stream of the data packets along the static pathway.

11. The method according to claim 10, further comprising replying to the received first control data based on the received first control data.

12. The method according to claim 10, wherein the first transport address and the second transport address are dynamically allocated for the duration of the call and the data plane flow of the stream of the data packets along the static pathway is controlled for the duration of the call.

13. The method according to claim 10, wherein the processing of the received first control data is selected, based on the first control data, to be synchronous or asynchronous.

14. The method according to claim 10, wherein the static pathway is determined such that it comprises forwarding elements performing one or more data plane applications.

15. The method according to claim 10, further comprising:
receiving, in the form of the first control data, an add request to establish a new context including a termination,
allocating, based on the first control data, a first transport address for a first routing port for incoming data packets associated with the termination of the context,
replying, in the form of the first control data, with an add reply to confirm the transport address allocated to the termination.

16. A converter for use in a mobile communications network for processing first control data relating to a call, wherein the converter comprises a processor and an interface, wherein:
the interface is configured to receive media gateway control protocol encoded first control data,
the processor is configured to process the first control data to obtain second control data,
the interface is configured to provide the second control data to a central control entity, and
the processor is configured to allocate, based on the first control data, a first transport address for a first routing port for incoming data packets of real time communication services of the call, and a second transport address for a second routing port for outgoing data packets of the real time communication services of the call,
the first routing port corresponds to a first end of a static pathway for a data plane flow of a stream of the data packets through a network of forwarding elements controlled by the central control entity and the second routing port corresponds to a second end of the static pathway.

17. The converter according to claim 16, wherein the processor is configured to reply to the received first control data based on the received first control data via the interface.

18. The converter according to claim 16, wherein the processor is configured to dynamically allocate the first transport address and the second transport address for the duration of the call.

19. The converter according to claim 16, wherein processor is configured to select, based on the first control data, whether processing the received first control data synchronously or asynchronously.

20. The converter according to claim 16, wherein the static pathway is determined to comprise forwarding elements performing one or more data plane applications.

* * * * *